United States Patent
Cai

(10) Patent No.: US 8,170,424 B2
(45) Date of Patent: May 1, 2012

(54) METHOD AND APPARATUS FOR OPTICAL SIGNAL POWER DISCRIMINATION

(75) Inventor: Yuanmin Cai, Hopewell Junction, NY (US)

(73) Assignee: International Buisness Machines Corporation, Armonk, NY (US)

( * ) Notice: Subject to any disclaimer, the term of this patent is extended or adjusted under 35 U.S.C. 154(b) by 483 days.

(21) Appl. No.: 12/496,835

(22) Filed: Jul. 2, 2009

(65) Prior Publication Data

US 2011/0002697 A1 Jan. 6, 2011

(51) Int. Cl.
*H04B 10/06* (2006.01)
*H04B 10/12* (2006.01)
*H04B 10/00* (2006.01)

(52) U.S. Cl. .......................... 398/201; 398/135; 398/188
(58) Field of Classification Search ................. 398/201
See application file for complete search history.

(56) References Cited

U.S. PATENT DOCUMENTS

| | | | |
|---|---|---|---|
| 6,509,990 B1* | 1/2003 | Roberts | 398/212 |
| 2002/0003652 A1* | 1/2002 | Leuthold | 359/332 |
| 2006/0202110 A1* | 9/2006 | Karlquist | 250/227.12 |
| 2010/0202783 A1* | 8/2010 | Von Lerber et al. | 398/175 |

OTHER PUBLICATIONS

Rajiv Ramaswami and Kumar N. Sivarajan, Opitcal networks a practical perspective, Third edition 1998 , pp. 85-89.*
Vahid G Ta'eed, Self-phase modulation based integrated optical Regenration in Chalcogenide waveguides, Jun. 2006, IEEE journal of selected topics in quantum electronics vol. 12 No. 3, pp. 360-370.*
Rong Zheng, Scalable Optical Access Network Design using variable optical splitters, 2003.*

* cited by examiner

*Primary Examiner* — Kenneth N Vanderpuye
*Assistant Examiner* — Amritbir Sandhu
(74) *Attorney, Agent, or Firm* — Scully, Scott, Murphy & Presser, P.C.; Yuanmin Cai

(57) ABSTRACT

The present invention provides an optical power level discriminating device and method for discriminating optical power levels. The optical discriminating device includes a splitter for receiving an optical signal having first and second signal states, and splitting the received optical signal into a first and a second branch optical signal. A first optical fiber for transporting the first branch optical signal is provided that is made of a material having a high non-linear refractive index providing a different non-linear phase shift to the first and second signal states of the first branch optical signal. A second optical fiber is provided for transporting the second branch optical signal with little or no non-linear effect. The discriminating device also includes a combiner for combining the first branch optical signal and second branch optical signal to produce an output optical signal. The output signal is resulted from a constructive interference between the first signal states of the first and second branch optical signals, and a destructive interference between the second signal states of the first and second branch optical signals.

24 Claims, 4 Drawing Sheets

METHOD AND APPARATUS FOR OPTICAL SIGNAL POWER DISCRIMINATION

FIELD OF THE INVENTION

The present invention relates to optical networks, and more particularly relates to an optical signal power handling device that discriminates optical signal states having different optical signal power levels.

BACKGROUND

Optical networks transport optical signals. An optical network usually includes nodes and spans, for example fiber spans or other optical transmission media. Digital optical signals having multiple states, for example one state representing a logic "1" and one state representing a logic "0", are generally transported, optically, between two adjacent nodes across a fiber span. Once a digital optical signal reaches a node at the end of the fiber span, it is usually converted into a digital electrical signal for content processing.

Optical communication systems or networks must be able to maintain a good quality of digital optical signals during transportation. Hereinafter, the terms "optical signal" and "digital optical signal" may be used interchangeably with both meaning a binary digital optical signal having one state representing a logic "1" and one state representing a logic "0". In recognizing the need for high quality optical signal, which may include for example power level and extinction ratio of the optical signal, various efforts have been devoted so far toward developing optical signal processing devices that may be used to manipulate and/or control the optical signal in the optical domain.

An optical amplifier is one such device that may be used to enhance the power level of an optical signal. However, there are currently no optical devices that can improve the extinction ratio, a ratio of power of the state of logic "1" over the state of logic "0", of an existing optical signal without first converting it into an electrical signal. Such an optical signal power handling device or "optical signal discriminator", as may be referred to hereinafter, will play a major role in both current and future optical signal processing technologies by virtue that the optical signal discriminator has the capability of reshaping and reconstructing original digital information in the optical domain. In the meantime, by improving the extinction ratio of an optical signal, an optical signal discriminator may be able to greatly improve receiver sensitivity of a node, in an optical network, that receives the digital optical signal, resulting in a low bit-error-rate and high fidelity of optical signal transmission.

SUMMARY

It would be highly desirable to provide a system and method for discriminating digital optical signal states associated with their power levels for use in optical networks.

In one embodiment, there is provided a method of discriminating power levels of an optical signal. The method comprises splitting an input optical signal into first and second branch signals, the input optical signal having first and second signal states; providing a first phase shift to the first signal state of the first branch signal; providing a second phase shift to the second signal state of the first branch signal; and, combining the first branch and second branch signals to produce an output optical signal, the combining causing a constructive interference between the first signal states of the first and second branch signals, and a destructive interference between the second signal states of the first and second branch signals.

A device for discriminating power levels of optical signals is also provided. The optical signal discriminator device comprises: a splitter for receiving an input optical signal having first and second signal states, and splitting the received optical signal into a first branch signal and a second branch signal; a first optical signal path, attached to a first output port of the splitter, for transporting the first branch signal, the first optical signal path providing a first phase shift to the first signal state of the first branch signal and a second phase shift to the second signal state of the first branch signal, wherein the first phase shift is different from the second phase shift; a second optical signal path, attached to a second output port of the splitter, for transporting the second branch signal; and a combiner having a first and a second input port being attached to the first optical signal path and the second optical signal path respectively, the combiner combining the first branch signal and the second branch signal to produce an output optical signal, the output optical signal resulting from a constructive interference between the first signal states of the first and second branch signals, and a destructive interference between the second signal states of the first and second branch signals.

According to a further aspect, there is provided an optical network comprising: at least a first optical network node including a transmitting device for transmitting an optical signal along an optical fiber for receipt at a second optical network node by a receiving device; the second optical network node including the receiving device; and
an optical discriminator device in series connection with the optical fiber between the first and second optical network nodes. The optical discriminator device comprises: a splitter for receiving the optical signal having first and second signal states, and splitting the received optical signal into a first branch signal and second branch signal; a first optical fiber for transporting the first branch signal, the first optical fiber having a non-linear refractive index causing a first and a second phase shift to the first and second signal states of the first branch signal; a second optical fiber for transporting the second branch signal; and a combiner for combining the first branch signal and the second branch signal to produce an output optical signal, the output optical signal resulting from a constructive interference between the first signal states of the first and second branch signals, and a destructive interference between the second signal states of the first and second branch signals, wherein the output signal is received at the second optical network node by the receiving device.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

DETAILED DESCRIPTION

Figure 1:
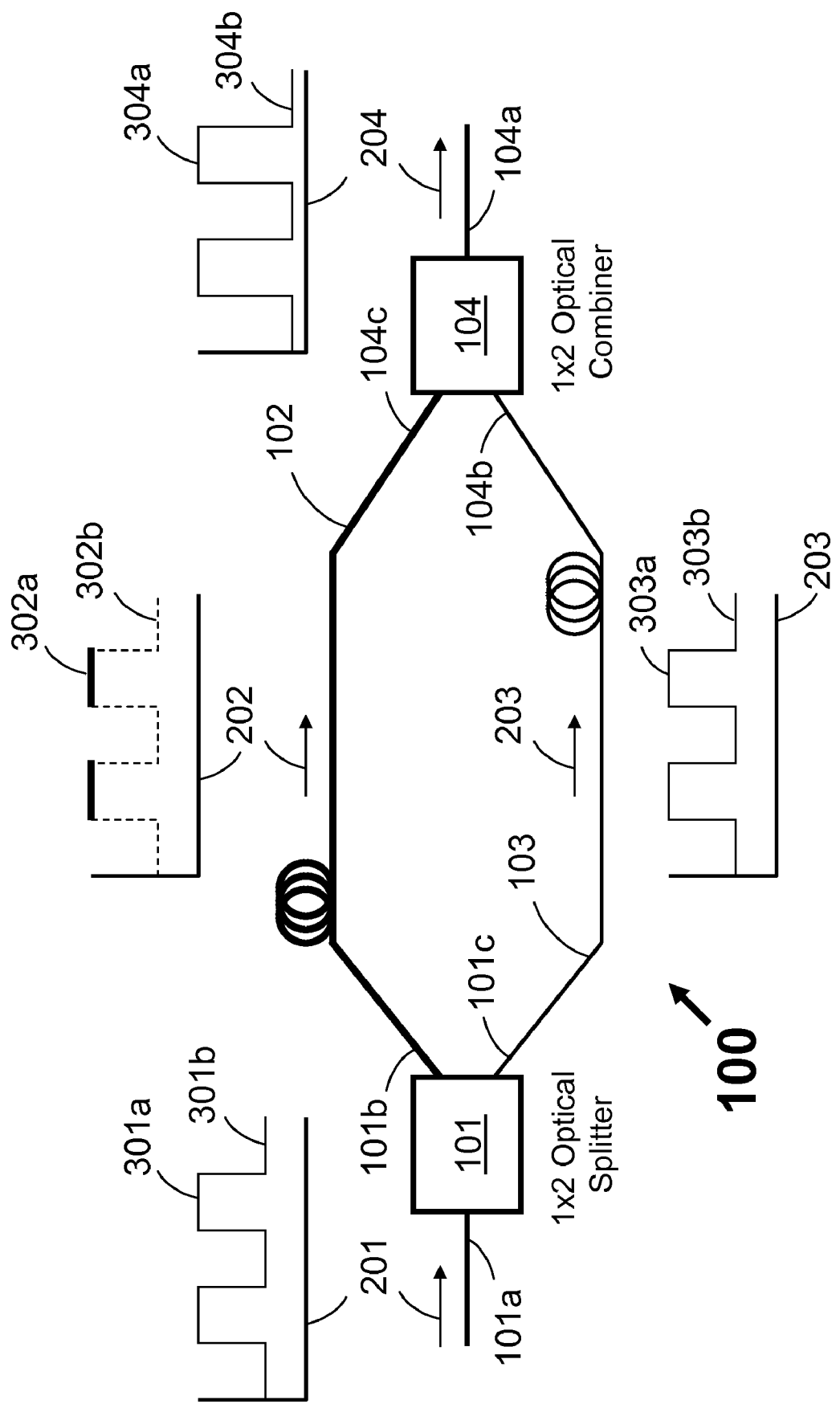
FIG. 1 illustrates a demonstrative configuration of an optical signal discriminator 100 in accordance with one embodiment of the invention.

FIG. 1 illustrates a demonstrative configuration of an optical power discriminator 100 in accordance with one embodiment of the invention. Apparatus 100 may provide discrimination of optical signal levels and/or states according to an embodiment of the invention. Optical power discriminator apparatus 100 includes: an input optical splitting device 101, which may be a 1×2 optical splitter in the embodiment depicted, having one input port 101a and two output ports 101b, 101c; and an output optical combining device 104, which may be a 1×2 optical combiner in the embodiment depicted, having two input ports 104b, 104c and one output port 104a. A first optical signal path 102, which may be a first optical fiber for example, connects a first output port 101b of optical splitting device 101 to a first input port 104c of optical combining device 104, and a second optical signal path 103, which may be a second optical fiber for example, connects a second output port 101c of optical splitting device 101 to a second input port 104b of optical combining device 104.

It should be understood that, the optical splitter 101 and combiner 104 are both bi-directional devices. That is, a splitter becomes a combiner when light/optical signal inside propagates in the opposite direction. Additionally, as known, splitter 101 and/or combiner 104 may be made of, for example, directional couplers, Y-branches, etc.

In further view of FIG. 1, optical fiber 102 preferably has a high optical intensity dependent refractive index, commonly known as non-linear refractive index. Optical fiber 103 preferably has a low non-linear refractive index, or a refractive index that is less dependent on optical intensity. Further, alternately, optical fiber 102 may have a relatively small cross-sectional area, which may create a higher optical intensity under a certain input optical power, thereby enhancing its non-linear effect on an optical signal propagating therein, and optical fiber 103 may have a relatively big cross-sectional area, which may cause a lower optical intensity under the same amount of input optical power as that in optical fiber 102, thereby having lower or no non-linear effect on an optical signal propagating therein.

Optical splitting device 101 (or splitter) and combining device 104 (or combiner) may be configured to have various combinations of power splitting and/or combining ratios. For example, in one embodiment, the optical splitting device 101 and combining device 104 may both be a 50:50 splitter and combiner. In this embodiment, because optical powers propagating inside fibers 102 and 103 are the same (absent other power altering devices, like an amplifier and/or an attenuator as being described below in connection with alternate embodiments), optical fibers 102 and 103 may be different, having either different non-linear refractive indices or cross-sectional areas for example, to have different amount of non-linear effect and, as a result, provide different amount of phase shifts to optical signals propagating therein, respectively, as being described below in more detail.

In an alternate embodiment, optical splitter 101 may be, for example, a 80:20 splitter with 80% of the signal power to/from (first) output port 101b. In this case, optical combiner 104 may be a 20:80 (inverse ratio of splitter 101) combiner, with 20% of the signal power from/to (first) input port 104c, which is connected to first output port 101b of optical splitter 101 through optical signal path 102. In general, if the power splitting ratio of splitter 101 is x:y, then the power combining ratio of combiner 104 shall be y:x, assuming losses of first optical signal path 102 and second optical signal path 103 to optical signals are substantially the same. This way, inside combiner 104, same amount of optical powers may come from first optical signal path 102 (or first optical fiber) and from second optical signal path 103 (or second optical fiber) to create constructive interference at a logic "1" signal level or state and destructive interference at a logic "0" signal level or state, as being described below in more detail.

In further view of FIG. 1, in operation, an optical signal 201 may be launched into input port 101a of splitter 101. Signal 201, for purposes of the following description, is a binary signal represented by a series of pulses at a first state 301a (representing a logic "1") and a second state 301b (representing a logic "0"). As shown in FIG. 1, second state 301b may contain certain amount of power (a ground level noise, for example) and is thus not a true "0" state. In other words, optical signal 201 exhibits a poor extinction ratio (i.e., a low ratio of optical power of "1" state over "0" state). Inside splitter 101, input optical signal 201 is split into first branch signal 202 propagating via splitter output port 101b along optical fiber 102, and second branch signal 203 propagating via splitter output port 101c along optical fiber 103.

Given the example description of input optical signal 201 being split into two branch optical signals 202 and 203, the following occurs: branch optical signal 202 propagating inside fiber 102, which has a large non-linear refractive index that is optical signal intensity dependent, is subject to a self-phase modulation (SPM) inside fiber 102 that may cause different states ("1" and "0") of optical signal 202, at different power levels, to experience different non-linear phase shifts ("first" and "second" phase shifts). According to one embodiment, difference in phase shift between "1" state 302a and "0" state 302b of signal 202 shown in FIG. 1 may amount to 180 degrees, or 180+N×360 degrees, where N is a whole number. In other words, "1" state 302a and "0" state 302b may become "out-of-phase", represented by the dark solid line and the light dashed line in FIG. 1. On the other hand, branch optical signal 203 propagating inside fiber 103, which has a small non-linear refractive index, may experience little or no non-linear phase shift. In other words, "1" state 303a and "0" state 303b of branch optical signal 203 may experience or accumulate zero phase difference and remain "in-phase", represented by the same solid line style.

As mentioned in view of FIG. 1, optical combiner 104 may combine branch optical signals 202 and 203 to produce an output optical signal 204 which exits via output port 104a of combiner 104. When the "1" state 302a of branch optical signal 202 is arranged to be in-phase with the "1" state 303a of branch optical signal 203, constructive interference between the two "1" states occurs which may produce a "1" state 304a of output optical signal 204. According to one embodiment of the invention, phase adjustment between branch optical signals 202 and 203 may be achieved by adjusting the length of optical fiber 102 and/or 103, and/or using a phase shifter as being described below in more details with reference to FIG. 2.

In the meantime, there occurs destructive interference between "0" state 302b of branch optical signal 202 and "0" state 303b of branch optical signal 203 since they are out-of-phase, which may produce a largely diminished "0" state 304b of output optical signal 204. The amount of power in "0" state 304b of output optical signal 204 is generally smaller than that of "0" state 301b of input optical signal 201, and in the ideal condition may become a true "0", indicating that signal 204 has an improved extinction ratio which is general preferably for reducing error-rate during signal detection.

In one embodiment, optical signal path 102 may be an optical fiber made of materials with high non-linear refractive index. Miller's rule, which is a semi-empirical relation for predicting nonlinearity, implies that a high linear refractive index generally leads to large non-linear (Kerr) refractive index. In the embodiment depicted, materials making optical fiber 102 may include, for example, a chalcogenide glass having a rather large refractive index, between 2 and 3. As known, chalcogenide glass materials exhibit significantly larger non-linear refractive indices than other glasses. Typically, their non-linear refractive indices in the telecommunication C-band (~1550 nm) are about two to three orders of magnitude greater than that of fused silica. Chalcogenide glasses suitable for making optical fiber 102 may generally include chalcogen elements including, but not limited to, sulfur, selenium and tellurium and may be combined with one or more other elements, commonly germanium, silicon, phosphorous, arsenic and antimony.

The amount of non-linear phase shift an optical signal may experience while propagating inside an optical fiber may be estimated by equation (1) as follows:

$$\Phi = r*P*L \tag{1}$$

Here, r is a nonlinearity coefficient that is proportional to the nonlinear-index coefficient $n_2$ of the fiber material, and inversely proportional to the effective cross-sectional area $A_{eff}$ of the fiber. In a typical fused fiber, r may be about 20 $W^{-1}$ $km^{-1}$. In the above equation, P is the optical signal power; and L is the fiber length. Thus, for example, in order to achieve a phase shift $\Phi = \pi$ under an input optical power condition of 20 mW and inside a regular fused fiber, an optical fiber length of around 8 km would be sufficient. If a fiber of higher non-linear index is used (such as the chalcogenide glass above whose non-linear refractive index is 2~3 orders of magnitude larger), the required fiber length may become much less.

Figure 2:
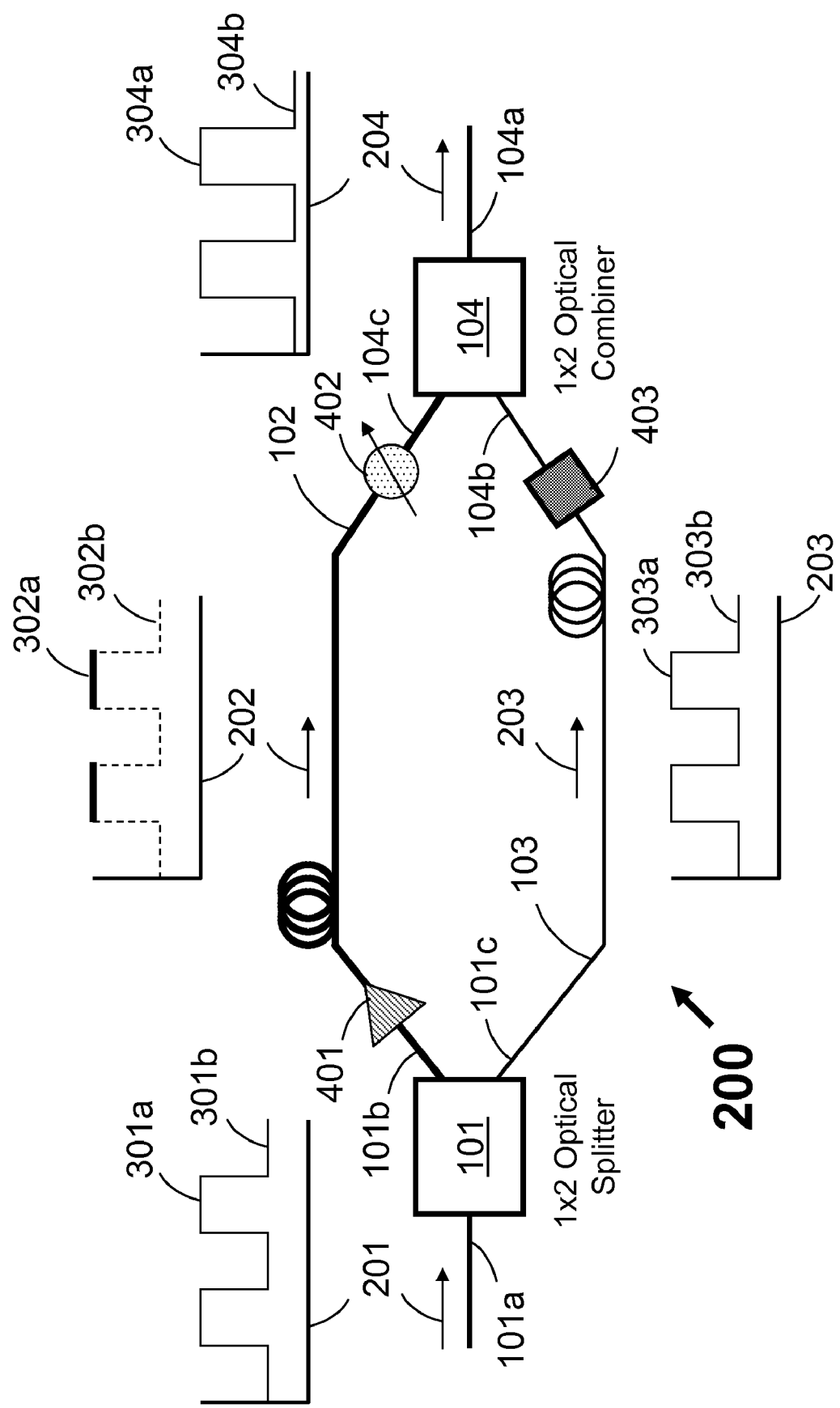
FIG. 2 illustrates several alternative configurations of optical signal discriminators according to other embodiments of the invention.

FIG. 2 illustrates alternative configurations of optical signal discriminators according to other embodiments of the invention. As shown in FIG. 2, discriminator 200 includes, along optical signal paths 102 and/or 103 connecting splitter 101 and combiner 104, one or more optical amplifier, attenuator and/or phase shifter devices. Each of the amplifier, attenuator and phase shifter elements may be used individually or in different combination with the configuration shown in FIG. 2 as one possibility.

An optical amplifier, such as optical amplifier 401 connected at the output port 101b of splitter 101, may be used to boost the optical signal power level launched into optical fiber 102 in order to enhance the non-linear effect of self-phase modulation (SPM) that branch optical signal 202 experiences inside optical fiber 102. That is, an amplifier connecting an output of the splitter to the first optical fiber boosts the power of the first and second signal states of the first branch signal, thereby enhancing a non-linear effect of the first optical fiber 102.

As further shown in FIG. 2, an attenuator 402 may be used to adjust the optical power level from fiber 102 into combiner 104 in such a way that a correct amount of power may be used to enable the constructive (for logic "1" state) or destructive (for logic "0" state) interference with signals coming from fiber 103. Attenuator 402 may be used in combination with the combining ratio of combiner 104. Although attenuator 402 is illustratively shown in optical signal path 102 or optical fiber 102 in FIG. 2, it may be placed in optical signal path 103 depending upon the actual need of power adjustment.

Additionally, a linear phase shifter 403 may be used to ensure and/or adjust the phase shift of optical signal 203 in fiber 103 such that logic "1" state 303a of optical signal 203 in fiber 103 is substantially "in-phase" (having a phase difference substantially close to zero or N×360 degrees with N being a whole number) with logic "1" state 302a of optical signal 202 in fiber 102. In other words, logic "0" state 303b of optical signal 203 in fiber 103 is also substantially "out-of-phase" with logic "0" state 302b of optical signal 202 in fiber 102. As being described above, logic "1" state 302a of optical signal 202 is "out-of-phase" with logic "0" state 302b of optical signal 202 because of non-linear phase shift. That is, the linear phase shifter may be employed for adjusting a phase shift of the first and second signal power levels of the second branch signal in the second optical fiber 103, thereby causing the constructive interference between said first signal states of the first and second branch signals, and the destructive interference between the second signal states of the first and second branch signals.

Figure 3:
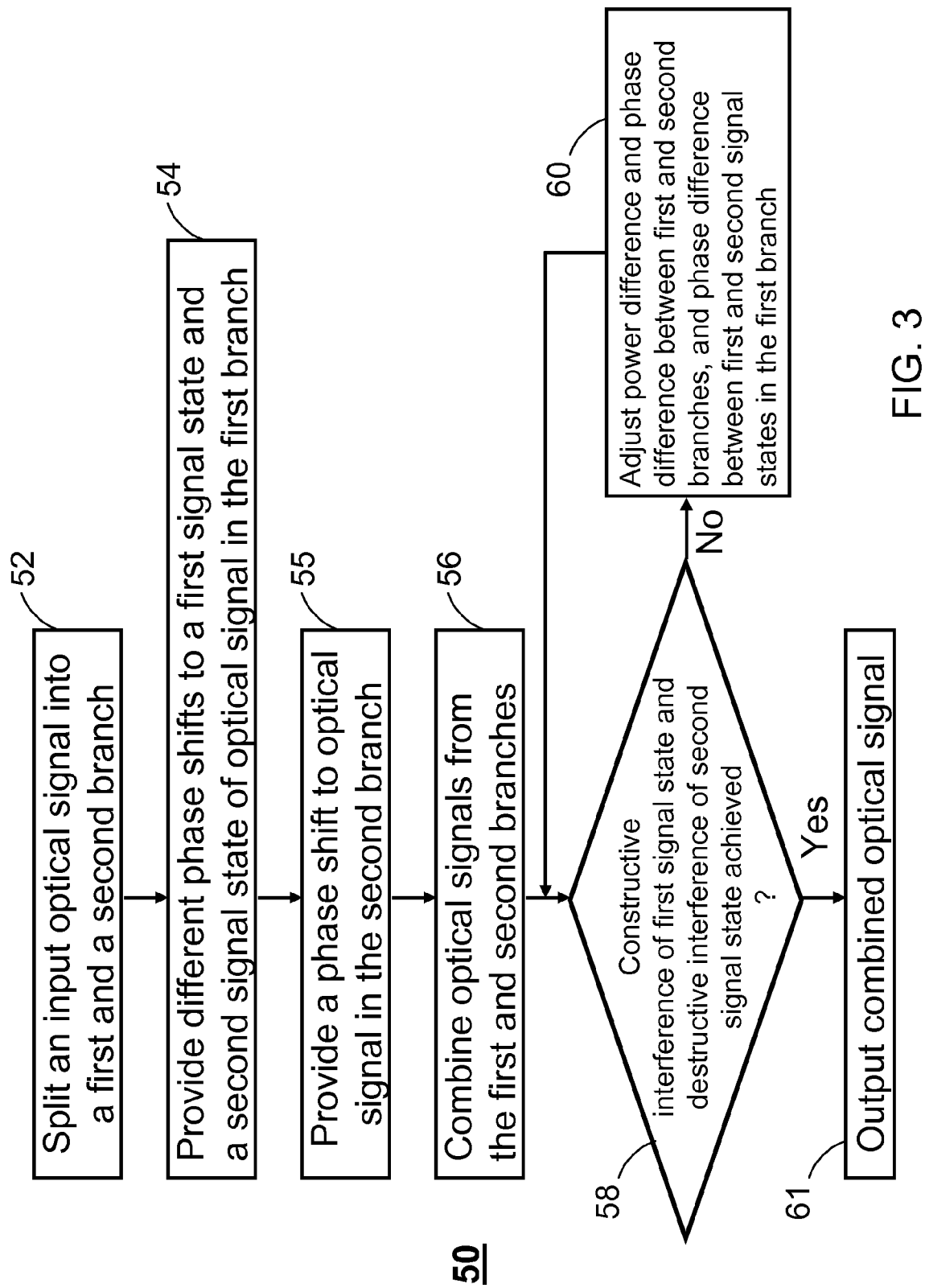
FIG. 3 depicts a simplified flowchart of a method in creating constructive interference of optical logic "1" state and destructive interference of optical logic "0" state.

FIG. 3 depicts a simplified flowchart illustrating a method 50 of creating constructive interference of optical logic "1" state and destructive interference of optical logic "0" state of an input optical signal. As shown in FIG. 3, method 50 includes a step 52 of splitting an input optical signal into first and second branch signals. The splitting may be made according to a power split ratio x:y, where x is the amount of input power being splitted and/or launched into a first branch optical signal path (e.g., fiber 102) and y is the amount of input power being splitted and/or launched into a second branch optical signal path (e.g., fiber 103). Then, at step 54, the method includes a step of providing different phase shifts to a first signal state, e.g., logic state "1", and a second signal state, e.g., logic state "0", of the first branch signal. The amount of non-linear phase shift (being provided may be dependent on the power levels of different signal states being launched into non-linear optical signal path 102. For instance, in one application, the difference of non-linear phase shift being provided to the logic state "1" and the logic state "0" may be substantially close to 180 degrees or N×360 degrees, where N is a whole number.

FIG. 3 further includes a step 55 of optionally providing a linear phase shift to the branch signal in the second optical signal path (e.g., optical fiber 103). This phase shift may be equally applied to both the logic "1" state and the logic "0" state of the branch signal 203. The linear phase shift may be applied to make logic "1" state 303a of branch signal 203 "in-phase" with logic "1" state 302a of branch signal 202, and logic "0" state 303b of branch signal 203 "out-of-phase" with logic "0" state 302b of branch signal 202.

Continuing at step 56, the method may include a further step of combining the branch signals (or branch optical signals) 202 and 203, carried by the first and second optical signal paths 102 and 103, to produce an output optical signal 204 (FIG. 1 and FIG. 2). Then, at a following step 58, a determination is made on whether proper constructive interference of the logic "1" signal state ("first signal state") and destructive interference of the logic "0" signal state ("second signal state") have been achieved.

If it is determined that constructive and/or destructive interference have been not properly achieved yet, then the method proceeds to a next step 60.

In order to achieve both desirable constructive interference for logic "1" signal state and desirable destructive interference for logic "0" signal state, it may be necessary, at step 60, to adjust the power levels and/or individual phase shift of the two interfering branch optical signals, as well as the phase difference between the two signal states "1" and "0" of one of the branch optical signal. This may be accomplished by the use of one or more optical amplifier, attenuator and/or phase shifter devices in the branch optical signal paths such as those shown in the embodiment depicted in FIG. 2, and by adjusting and/or carefully selecting the type of fiber used and the length used, if the optical signal paths are optical fibers.

For example, in order to achieve a certain phase difference between logic state "0" and logic state "1" of optical signal 202 in fiber 102, the non-linear effect of SPM may be adjusted by either using an amplifier to increase or using an attenuator to decrease the level of optical signal power launched into optical fiber 102, and/or by selecting the type of fiber with proper non-refractive index and the length of fiber to accumulate a proper non-linear phase shift. Further for example, a phase shifter, preferably a linear phase shifter, may be used in one of the branch optical signal paths, either 102 or 103, to achieve "in-phase" status (e.g., substantially close to zero, or N×360 degrees, where N is a whole number) of logic "1" states of branch optical signals 202 and 203, or "out-of-phase" status (e.g., substantially close to 180 degrees, or 180+N×360 degrees, where N is a whole number) of logic "0" states of branch optical signals 202 and 203 to ensure constructive interference at logic state "1" and destructive interference at logic state "0" of optical signals 202, 203. It should be understood that steps 58 and 60 may be repeated by looping as shown in FIG. 3, in order to reach a pre-determined quality of optical signal for the particular application. Finally, the combined optical signal is output at step 61.

An optical signal power handling device or optical power discriminator, as those being described above, may be used in an optical network, for example, at a receiver side of an optical node to enhance the extinction ratio of optical signals being received, according to one embodiment of the present invention. Normally, as an optical signal propagates through an optical transmission media such as a fiber, various noises may be added onto the optical signal. The optical signals can only be detected at above a certain signal-to-noise ratio often due to limitation in receiver sensitivity. In addition, the optical transmission media such as fiber may also induce dispersion to cause pulse spread of the digital optical signal, which further degrades the receiver sensitivity. Both noise and dispersion increase with the increase in transmission distance and are generally more pronounced at higher data rates, which in the end limits the attainable distance and data rate of the optical transmission system. With the introduction of the optical power handling device or optical signal discriminator, when being used properly at a receiver side, the discriminator, such as discriminator 100 or 200 shown in FIGS. 1 and 2, may be able to reshape a dispersion distorted and/or noise loaded optical signal to achieve a better extinction ratio, which ultimately leads to improved system bit error rate (BER).

Figure 4:
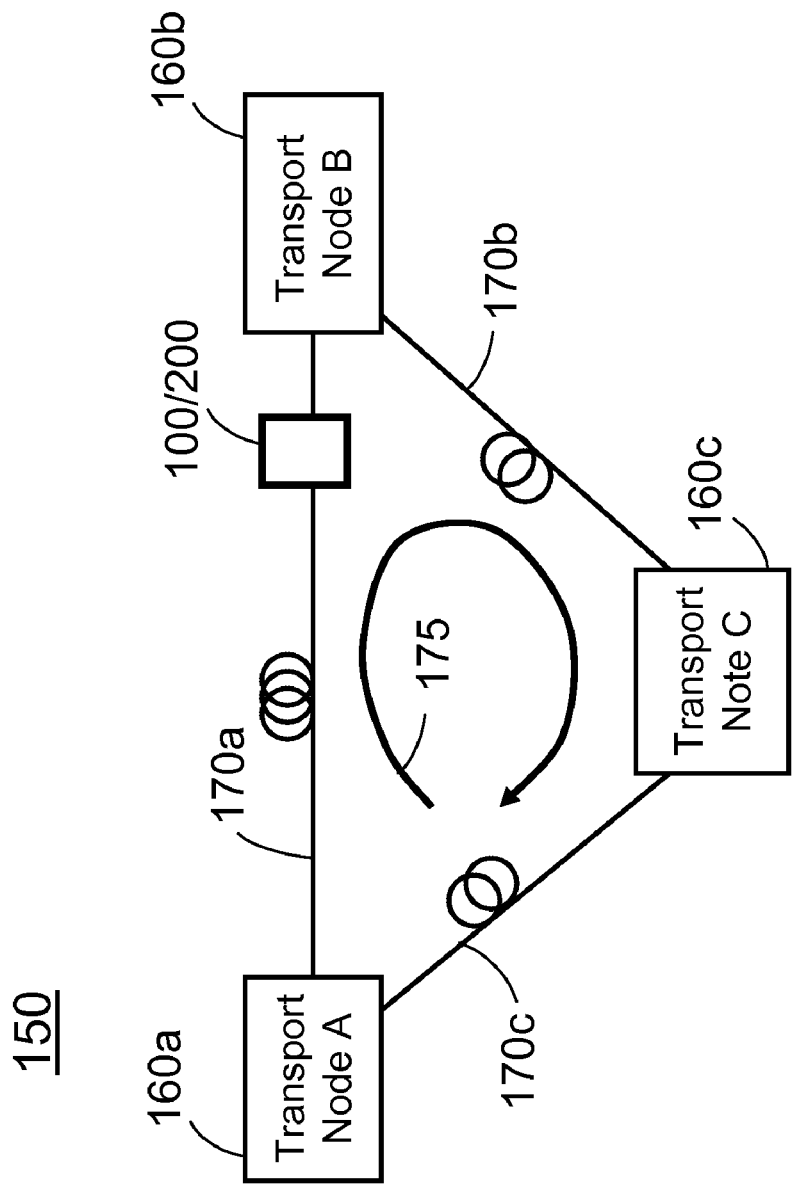
FIG. 4 depicts a demonstrative system of optical network employing an optical signal discriminator for reshaping optical signal for improved extinction ratio.

FIG. 4 depicts a demonstrative system of optical network employing an optical discriminator for reshaping optical signal for improved extinction ratio. In FIG. 4, system 150 includes an optical network having transport nodes 160a, 160b, 160c for transmitting and/or receiving optical signals transmitted along optical fiber spans 170a, 170b, 170c. For example, in optical network system 150, optical signals may travel along a path direction 175 such that optical signals are transmitted or launched out of transport node 160a, along fiber span 170a for receipt at transport node 160b which further transmits optical signals along fiber span 170b for receipt at transport node 160c which send signals along the fiber span 170c back to originator transport node 160a. An optical signal discriminator, such as discriminator 100 described herein with respect to FIG. 1 or discriminator 200 described herein with respect to FIG. 2 may be incorporated at a certain location in series with, for example, fiber span 170a (as shown in FIG. 4), in order to enhance signal extinction ratio received at the receiver of node 160b. Alternately, optical power discriminator(s) may be disposed in series with fiber span 170b and/or 170c for the same purpose. The location and placement of the discriminator may be optimized to achieve improved system performance.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method comprising:
splitting an input optical signal into first and second branch signals, said input optical signal having first and second signal states;
providing a first phase shift to said first signal state of said first branch signal;
providing a second phase shift to said second signal state of said first branch signal; and,
combining said first branch and second branch signals to produce an output optical signal, said combining causing a constructive interference between said first signal states of said first and second branch signals, and a destructive interference between said second signal states of said first and second branch signals.

2. The method of claim 1, wherein said first phase shift is substantially close to 180 degree different from said second phase shift.

3. The method of claim 1, wherein providing said first and second phase shifts comprises causing non-linear self-phase modulation to said first and second signal states of said first branch signal.

4. The method of claim 1, wherein providing said first and second phase shifts comprises causing said first branch signal to pass through an optical fiber made of a chalcogenide glass material having a non-linear refractive index between 2 and 3.

5. The method of claim 4, wherein said chalcogenide glass material includes chalcogen element of sulfur, selenium and tellurium, and at least one of the following elements: germanium, silicon, phosphorous, arsenic and antimony.

6. The method of claim 1, further comprising:
adjusting optical signal powers of said first and second branch signals to have a substantially same amount at said first signal state and at said second signal state respectively, and combining the adjusted first and second branch signals to produce said output optical signal.

7. The method of claim 1, further comprising:
adjusting a phase difference between said first signal states of said first and second branch signals to be substantially close to zero to result in said constructive interference.

8. The method of claim 1, further comprising:
adjusting a phase difference between said second signal states of said first and second branch signals to be substantially close to 180-degree to result in said destructive interference.

9. An optical signal discriminator comprising:
a splitter for receiving an input optical signal having first and second signal states, and splitting said received optical signal into a first branch signal and a second branch signal;
a first optical signal path, attached to a first output port of said splitter, for transporting said first branch signal, said first optical signal path providing a first phase shift to said first signal state of said first branch signal and a second phase shift to said second signal state of said first branch signal, wherein said first phase shift is different from said second phase shift;

a second optical signal path, attached to a second output port of said splitter, for transporting said second branch signal; and a combiner having a first and a second input port being attached to said first optical signal path and said second optical signal path respectively, said combiner combining said first branch signal and said second branch signal to produce an output optical signal, said output optical signal resulting from a constructive interference between said first signal states of said first and second branch signals, and a destructive interference between said second signal states of said first and second branch signals.

10. The optical signal discriminator of claim 9, wherein said first and second optical signal paths are first and second optical fibers, said first optical fiber having a large non-linear refractive index, said non-linear refractive index providing different amount of self-phase modulation to said first and second signal states of said first branch signal, causing said first and second phase shifts.

11. The optical signal discriminator of claim 10, wherein said first optical fiber is made of a chalcogenide glass material, having a non-linear refractive index between 2 and 3.

12. The optical signal discriminator of claim 11, wherein said chalcogenide glass material includes chalcogen element of sulfur, selenium and tellurium, and at least one of the following elements: germanium, silicon, phosphorous, arsenic and antimony.

13. The optical signal discriminator of claim 9, wherein said splitter provides a power splitting ratio of x:y toward said first and second optical signal paths respectively, where x represents a power level of said first branch signal and y represents a power level of said second branch signal, and wherein said combiner provides a power combining ratio of y:x coming from said first and second optical signal paths respectively.

14. The optical signal discriminator of claim 9, wherein said splitter splits said input optical power 50:50 into said first optical signal path and said second optical signal path, and wherein said combiner combines said first and second branch signals, from said first and second optical signal paths respectively, in a ratio of 50:50.

15. The optical signal discriminator of claim 10, further comprising:
an amplifier connecting said first output port of said splitter to said first optical fiber for boosting power of said first and second signal states of said first branch signal, thereby enhancing said self-phase modulation to said first and second signal states of said first branch signal.

16. The optical signal discriminator of claim 10, further comprising:
an attenuator in series with said first optical fiber for adjusting power of said first branch signal in such a way that a correct amount of power may be used for causing said constructive interference between said first signal states of said first and second branch signals, and said destructive interference between said second signal states of said first and second branch signals.

17. The optical signal discriminator of claim 10, further comprising:
a linear phase shifter for adjusting a phase shift of said first and second signal states of said second branch signal in said second optical fiber, thereby causing said constructive interference between said first signal states of said first and second branch signals, and said destructive interference between said second signal states of said first and second branch signals.

18. An optical network comprising:
at least a first optical network node including a transmitting device for transmitting an optical signal along an optical fiber for receipt at a second optical network node by a receiving device;
said second optical network node including said receiving device; and
an optical discriminator device in series connection with said optical fiber between said first and second optical network nodes, said optical discriminator device comprising:
a splitter for receiving said optical signal having first and second signal states, and splitting said received optical signal into a first branch signal and second branch signal;
a first optical fiber for transporting said first branch signal, said first optical fiber having a non-linear refractive index causing a first and a second phase shift to said first and second signal states of said first branch signal;
a second optical fiber for transporting said second branch signal; and
a combiner for combining said first branch signal and said second branch signal to produce an output optical signal, said output optical signal resulting from a constructive interference between said first signal states of said first and second branch signals, and a destructive interference between said second signal states of said first and second branch signals,
wherein said output signal is received at said second optical network node by said receiving device.

19. The optical network of claim 18, wherein said splitter provides a power splitting ratio of x:y where x represents a power level of said first branch signal and y represents a power level of said second branch signal, and wherein said combiner has a power combining ratio of y:x.

20. The optical network of claim 18, wherein said first optical fiber is of a chalcogenide glass material, having a non-linear refractive index between 2 and 3.

21. The optical network of claim 20, wherein said chalcogenide glass material includes chalcogen element of sulfur, selenium and tellurium, and at least one of the following elements: germanium, silicon, phosphorous, arsenic and antimony.

22. The optical network of claim 18, further comprising:
an amplifier connecting an output of said splitter to said first optical fiber for boosting power of said first and second signal states of said first branch signal, thereby enhancing a non-linear effect of said first optical fiber.

23. The optical network of claim 18, further comprising:
an attenuator in series with said first optical fiber for adjusting power of said first branch signal in such a way that a correct amount of power may be used for causing said constructive interference between said first signal states of said first and second branch signals, and said destructive interference between said second signal states of said first and second branch signals.

24. The optical network of claim 18, further comprising:
a linear phase shifter for adjusting a phase shift of said first and second signal power levels of said second branch signal in said second optical fiber, thereby causing said constructive interference between said first signal states of said first and second branch signals, and said destructive interference between said second signal states of said first and second branch signals.

* * * * *